(12) United States Patent
Vincent et al.

(10) Patent No.: US 12,286,898 B2
(45) Date of Patent: Apr. 29, 2025

(54) LAYOUT FOR ASYMMETRIC CAST TRIPS IN LONG PASSAGES

(71) Applicant: Raytheon Technologies Corporation, Farmington, CT (US)

(72) Inventors: Tyler G. Vincent, Portland, CT (US); Joshua William Owen Richards, Manchester, CT (US)

(73) Assignee: RTX Corporation, Farmington, CT (US)

(*) Notice: Subject to any disclaimer, the term of this patent is extended or adjusted under 35 U.S.C. 154(b) by 24 days.

(21) Appl. No.: 18/135,811

(22) Filed: Apr. 18, 2023

(65) Prior Publication Data
US 2024/0352860 A1    Oct. 24, 2024

(51) Int. Cl.
| F01D 5/08 | (2006.01) |
| F01D 5/14 | (2006.01) |
| F01D 5/18 | (2006.01) |
| F01D 25/12 | (2006.01) |
| F28F 13/12 | (2006.01) |
| F15D 1/00 | (2006.01) |

(52) U.S. Cl.
CPC ............ *F01D 5/18* (2013.01); *F01D 5/08* (2013.01); *F01D 5/085* (2013.01); *F01D 5/145* (2013.01); *F01D 5/187* (2013.01); *F01D 25/12* (2013.01); *F28F 13/12* (2013.01); *F05D 2220/32* (2013.01); *F05D 2240/12* (2013.01); *F05D 2240/127* (2013.01); *F05D 2240/30* (2013.01); *F05D 2260/20* (2013.01); *F15D 1/003* (2013.01)

(58) Field of Classification Search
CPC .. F01D 5/18; F01D 5/187; F01D 25/12; F28F 13/12
See application file for complete search history.

(56) References Cited

U.S. PATENT DOCUMENTS

| 5,681,144 A | * | 10/1997 | Spring | F01D 5/187 415/115 |
| 6,406,260 B1 | | 6/2002 | Trindade et al. | |
| 7,753,650 B1 | * | 7/2010 | Liang | F01D 5/187 416/97 R |
| 8,419,365 B2 | * | 4/2013 | Kizuka | F01D 5/20 415/115 |

(Continued)

FOREIGN PATENT DOCUMENTS

CN    112177681 A    1/2021

OTHER PUBLICATIONS

Extended European Search Report for counterpart EP Application No. 24170538.3 mailed Jul. 3, 2024.

*Primary Examiner* — David E Sosnowski
*Assistant Examiner* — Theodore C Ribadeneyra
(74) *Attorney, Agent, or Firm* — Bachman & LaPointe, P.C.

(57) ABSTRACT

A layout for asymmetric trip strips including a flow passage having a lower wall and an upper wall opposite the lower wall, each of the lower wall and the upper wall including an inner surface, the flow passage having a passage inlet and a length L and a diameter d; multiple skewed trip strips extending from at least one inner surface of the lower wall or the upper wall; and at least one periodic reflection of the skewed trip strips along the flow passage downstream of the passage inlet at a frequency with a length-to-diameter ratio of L/d≤20.

20 Claims, 3 Drawing Sheets

(56) References Cited

U.S. PATENT DOCUMENTS

| | | | | |
|---|---|---|---|---|
| 8,920,122 B2* | 12/2014 | Lee | ............... | F01D 5/186 |
| | | | | 416/97 R |
| 9,091,495 B2* | 7/2015 | Lee | ............... | F01D 5/187 |
| 10,156,157 B2* | 12/2018 | King | ............... | F02C 7/18 |
| 10,202,864 B2 | 2/2019 | Clum et al. | | |
| 10,316,668 B2* | 6/2019 | Blake | ............... | F01D 5/181 |
| 11,085,304 B2 | 8/2021 | Styborski et al. | | |
| 2008/0089787 A1 | 4/2008 | Abdel-Messeh et al. | | |
| 2008/0159874 A1* | 7/2008 | Pietraszkiewicz | ...... | F01D 5/186 |
| | | | | 415/115 |
| 2013/0243591 A1 | 9/2013 | Propheter-Hinckley et al. | | |
| 2016/0319671 A1 | 11/2016 | Benson et al. | | |
| 2018/0363991 A1 | 12/2018 | Cukurel | | |

* cited by examiner

LAYOUT FOR ASYMMETRIC CAST TRIPS IN LONG PASSAGES

BACKGROUND

The present disclosure is directed to improved turbulated passages, particularly periodic alteration of trip direction of the turbulators to mix flow in passages with turbulators.

It is customary in turbine engines to provide internal cooling (heating) passages in turbine blades or buckets, vanes, blade outer air seals, as well as incorporation of cast heat exchangers (HEXs).

In some cases, cooling passages are provided within the heat exchanger extending across the heat exchanger. Cooling air from one of the stages of the gas turbine engine is conventionally supplied to these passages to cool/heat the heat exchanger. Turbulence promoters, rib turbulators or trip strips have been employed throughout the entire length of these passages to enhance the heat transfer of the heat transfer fluid through the passages.

Thermal energy conducts from the hot side of the heat exchanger to the cold side, and heat is extracted by internal cooling/heating. Heat transfer performance in a ribbed channel primarily depends on the channel diameter, the rib configuration, and the flow Reynolds number.

There have been many fundamental studies to understand the heat transfer enhancement phenomena by the flow separation caused by the ribs. In the flow past surface-mounted ribs, a boundary layer separates upstream and downstream of the ribs. These flow separations reattach the boundary layer to the heat transfer surface, thus increasing the heat transfer coefficient. The separated boundary layer enhances turbulent mixing, and therefore the heat from the near-surface fluid can more effectively get dissipated to the main flow, thus increasing the heat transfer coefficient.

The turbulence promoters used in these passageways take many forms. For example, they may be trip strips attached to side walls of the passageway, which are at an angle to the flow of cooling air through the passageway. Trip strips can include, but not limited to, chevron trips, inclined/skewed trips, w-shaped trips and the like attached to the side walls of the passageway.

For the incorporation of heat exchangers in turbo-machinery applications, the secondary air system requires heat exchange with a specified maximum flow pressure loss. For systems with low pressure loss (dP) requirements, cast heat exchangers may desire lower loss trip strip configurations to maintain ample flow rate and heat energy exchange. One such type of trip strip configuration is known as a skewed trip, which is inherently asymmetric.

Due to the trip strip's asymmetric nature, heat exchange is non-uniform and a profile perpendicular to the streamwise flow direction is asymmetric. For shorter passages with small Length-to-diameter ratios (L/d<20), this asymmetry has not been shown to significantly impact streamwise heat transfer decay rate. However, for larger L/d passages (L/d>20), the asymmetric profile of the temperature in the passage can lead to degraded heat transfer performance at regions sufficiently downstream of the passage inlet (L/d>20).

In a skewed trip passage, a flow vortex builds at a trip leading edge and directs flow towards a channel end wall aligned with a downstream direction of the trip strip. As flow in the vortex travels, the fluid picks up heat and increases in temperature. Over a long enough length, this temperature builds up and becomes "thermally saturated" (i.e., temperature of the fluid approaches temperature of wall). Once thermally saturated, the fluid has less ability to transfer heat. This leads to degraded heat transfer performance at large L/d passages. For the example skewed trip geometry, this thermal saturation will occur more quickly on the end wall aligned with the downstream edge of the trip. Unless mitigated, this saturation will lead to degraded heat exchanging performance.

Despite the existence of the turbulated cooling passageways, there remains a need for surfaces which have improved cooling to employ techniques to prevent the streamwise heat transfer decay rate and degraded heat transfer performance.

SUMMARY

In accordance with the present disclosure, there is provided a layout for asymmetric trip strips comprising: a flow passage having a lower wall and an upper wall opposite the lower wall, each of the lower wall and the upper wall including an inner surface, the flow passage having a passage inlet and a length L and a diameter d; multiple skewed trip strips extending from at least one inner surface of the lower wall or the upper wall; and at least one periodic reflection of the skewed trip strips along the flow passage downstream of the passage inlet at a frequency with a length-to-diameter ratio of $L/d \leq 20$.

A further embodiment of any of the foregoing embodiments may additionally and/or alternatively include the multiple skewed trip strips are formed in each of the lower wall and the upper wall; and the at least one periodic reflection of the skewed trip strips is formed in each of the lower wall and the upper wall.

A further embodiment of any of the foregoing embodiments may additionally and/or alternatively include the periodic reflection can include the periodic alternation of the direction of the skewed trip strips in the flow passage having a length-to-diameter ratio L/d of greater than or equal to 20.

A further embodiment of any of the foregoing embodiments may additionally and/or alternatively include the periodic reflection includes switching an orientation of the skewed trip strips relative to a center of passage.

A further embodiment of any of the foregoing embodiments may additionally and/or alternatively include the periodic reflection includes reversing an orientation of an angle of the skewed trip strips.

A further embodiment of any of the foregoing embodiments may additionally and/or alternatively include the skewed trip strips are configured with an asymmetric orientation with respect to a flow direction parallel to a plane of a wall supporting the skewed trip strips.

A further embodiment of any of the foregoing embodiments may additionally and/or alternatively include the flow passage is formed in a gas turbine component selected from the group consisting of a blade, a vane, a blade outer air seal, and heat exchanger.

In accordance with the present disclosure, there is provided a layout for asymmetric trip strips for a component for a gas turbine engine comprising: an external surface bounding a gas path of the gas turbine engine; a flow passage having an inlet configured to deliver an airflow therethrough, including an internal surface located opposite the external surface, the internal surface and the external surface together defining a component wall; a plurality of skewed trip strips located along the internal surface, each skewed trip strip extending from the internal surface; and at least one periodic reflection of the skewed trip strips along the flow passage downstream of the passage inlet at a frequency with a length-to-diameter ratio of L/d≤20.

A further embodiment of any of the foregoing embodiments may additionally and/or alternatively include the skewed trip strips are oriented with an angle, wherein the periodic reflection includes reversing an orientation of the angle of the skewed trip strips.

A further embodiment of any of the foregoing embodiments may additionally and/or alternatively include the periodic reflection can include a periodic alternation of the direction of the skewed trip strips in the flow passage having a length-to-diameter ratio L/d of greater than or equal to 20.

A further embodiment of any of the foregoing embodiments may additionally and/or alternatively include the periodic reflection includes switching an orientation of the skewed trip strip relative to a center of passage.

A further embodiment of any of the foregoing embodiments may additionally and/or alternatively include the skewed trip strips are configured with an asymmetric orientation with respect to a flow direction parallel to a plane of a wall supporting the skewed trip strips.

A further embodiment of any of the foregoing embodiments may additionally and/or alternatively include the flow passage is formed in the gas turbine component selected from the group consisting of a blade, a vane, a blade outer air seal, and a heat exchanger.

In accordance with the present disclosure, there is provided a process for managing a fluid flow through a flow passage having asymmetric trip strips for a gas turbine engine component comprising: bounding a gas path of the gas turbine engine with an external surface; delivering an airflow through a flow passage having an inlet; defining a component wall with an internal surface located opposite the external surface; locating a plurality of the asymmetric trip strips along the internal surface, each asymmetric trip strip extending from the internal surface; and locating at least one periodic reflection of the asymmetric trip strips along the flow passage downstream of the passage inlet at a frequency with a length-to-diameter ratio of L/d≤20.

A further embodiment of any of the foregoing embodiments may additionally and/or alternatively include the asymmetric trip strips are oriented with an angle; and reversing the orientation of the angle of the asymmetric trip strips.

A further embodiment of any of the foregoing embodiments may additionally and/or alternatively include the process further comprising periodic alternation of the direction of the asymmetric trip strips in the flow passage having a length-to-diameter ratio L/d of greater than or equal to 20.

A further embodiment of any of the foregoing embodiments may additionally and/or alternatively include the process further comprising switching an orientation of the asymmetric trip strip relative to a center of passage.

A further embodiment of any of the foregoing embodiments may additionally and/or alternatively include the process further comprising configuring the asymmetric trip strips with an asymmetric orientation with respect to a flow direction parallel to a plane of a wall supporting the asymmetric trip strips.

A further embodiment of any of the foregoing embodiments may additionally and/or alternatively include delivering the airflow through the flow passage includes at least one of a fluid cooling passage and a fluid heating passage.

A further embodiment of any of the foregoing embodiments may additionally and/or alternatively include the process further comprising reforming a vortex downstream of the periodic reflection within the flow passage by periodic alteration of asymmetric trip strips direction configured to redirect fluid to mix the flow of the fluid.

Other details of the layout for asymmetric trip strips are set forth in the following detailed description and the accompanying drawings wherein like reference numerals depict like elements.

DETAILED DESCRIPTION

Figure 1:
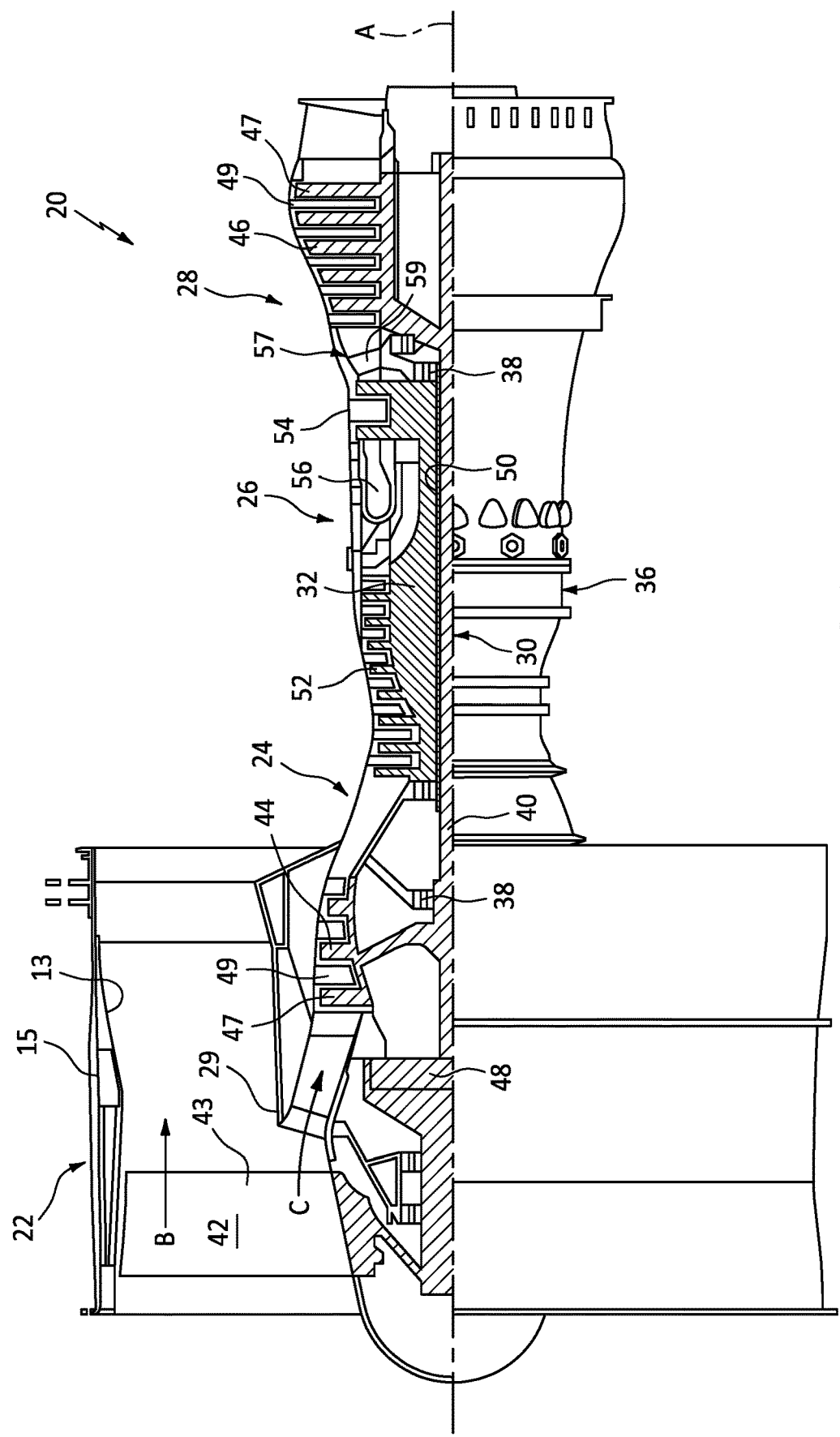
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption-also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(Tram° R)/(518.7° R)]^{0.5}$. The "low corrected fan tip speed" can be less than or equal to 1150.0 ft/second (350.5 meters/second), and greater than or equal to 1000.0 ft/second (304.8 meters/second).

Figure 2:
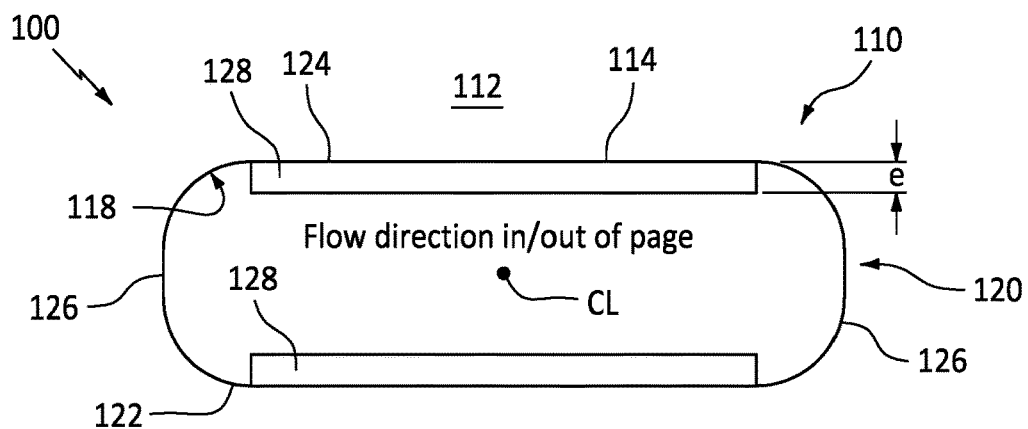
FIG. 2 is a cross sectional schematic representation of an exemplary layout for asymmetric trip strips in a flow passage with turbulators.
Figure 3:
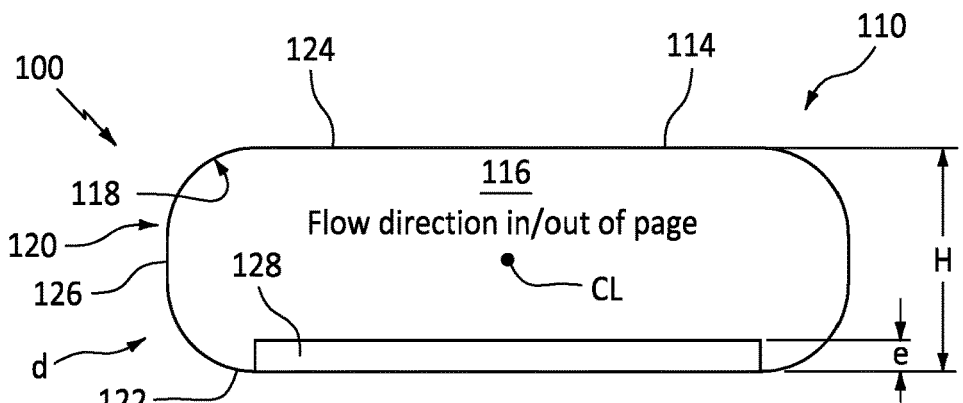
FIG. 3 is a cross sectional schematic representation of exemplary layout for asymmetric trip strips in a flow passage with turbulators.
Figure 4:
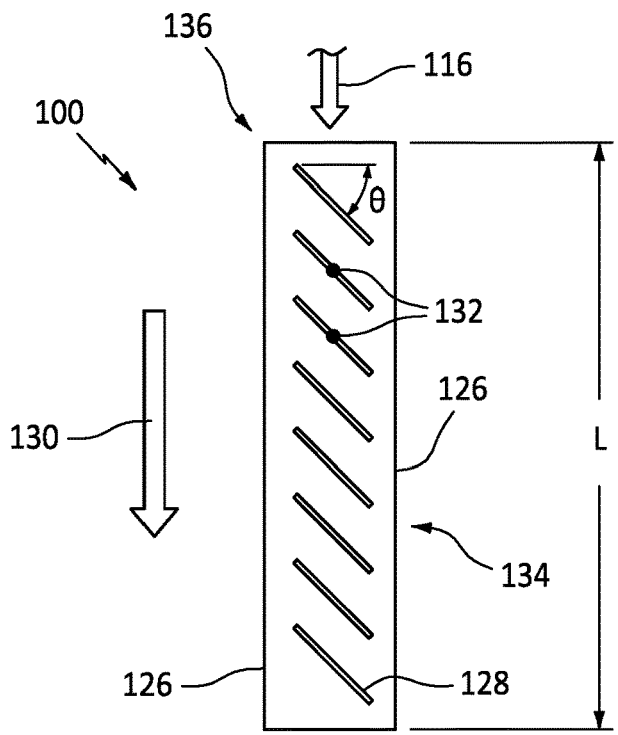
FIG. 4 is a plan view schematic representation of exemplary layout for asymmetric trip strips in a flow passage with turbulators.

Referring now to FIG. 2, FIG. 3, and FIG. 4, a flow passage 100 formed in a gas turbine component 110, such as a blade, vane or blade outer air seal or heat exchanger is shown. The flow passage 100 can be thermally coupled to a hot gas path 112 in communication with an outer surface 114 for a blade, vane, blade outer air seal, heat exchanger and any other cooling flow structure where heat transfer fluid 116 can flow over inner surfaces 118 to transfer thermal energy from the hot inner surfaces 118 to the fluid 116. The gas path 112 can be a cooling flow in alternative embodiments, leading to the inner surfaces 118 to be cooler than heat transfer fluid 116. The flow passage 100 can be bounded by a component wall 120 that can include a lower wall 122 opposite an upper wall 124. The flow passage 100 includes passage separation walls 126 opposite each other. The passage separation walls 126 define the flow passage 100 boundaries laterally. The lower wall 122 and upper wall 124 are shown approximately parallel to each other, however it is contemplated that the lower wall 122 and the upper wall 124 can be asymmetrically aligned relative to a passage centerline CL. The passage separation walls 126 are shown approximately parallel with each other, however it is contemplated that the passage separation walls 126 can be asymmetrically aligned with respect to each other and/or the lower wall 122 and upper wall 124. The asymmetry of the walls 122, 124, 126 can influence flow patterns in the cooling fluid 116 flowing through the flow passage 100.

Multiple flow turbulators or trip strips 128 can be formed in each of the lower wall 122 and the upper wall 124 as seen in FIG. 2 or formed on a single wall as seen in FIG. 2. The trip strips 128 extend a distance e from the lower wall 122 and upper wall 124 respectively. Each trip strip 128 has a trip strip height (e), extending from the inner surface 118 and a trip strip width, (W), extending along the internal surface 118 laterally. Further, adjacent trip strips 128 are separated by (spacing) a trip strip pitch, (P), along the stream-wise flow direction 130. The trip strip pitch, (P), is measured between centers 132 of the adjacent trip strips 128. In some embodiments, the trip strips 128 may have a cross-section aspect ratio of 1≤H/W≤4. Each trip strip 128 can have an e/H of about 0.01 to about 0.3.

The trip strips 128 produce a non-uniform asymmetric flow profile that is perpendicular to the streamwise flow direction which mix the spent, near wall gas with bulk, or central fluid. The mixing results in a higher temperature differential between the fluid 116 and inner surfaces 118, producing high heat transfer.

For the incorporation of heat exchangers in turbo-machinery applications, the secondary air system requires heat exchange with a specified maximum flow pressure loss. For systems with low pressure loss (dP) requirements, cast heat exchangers may desire lower loss trip strip 128 configurations to maintain ample flow rate and heat energy exchange.

Figure 5:
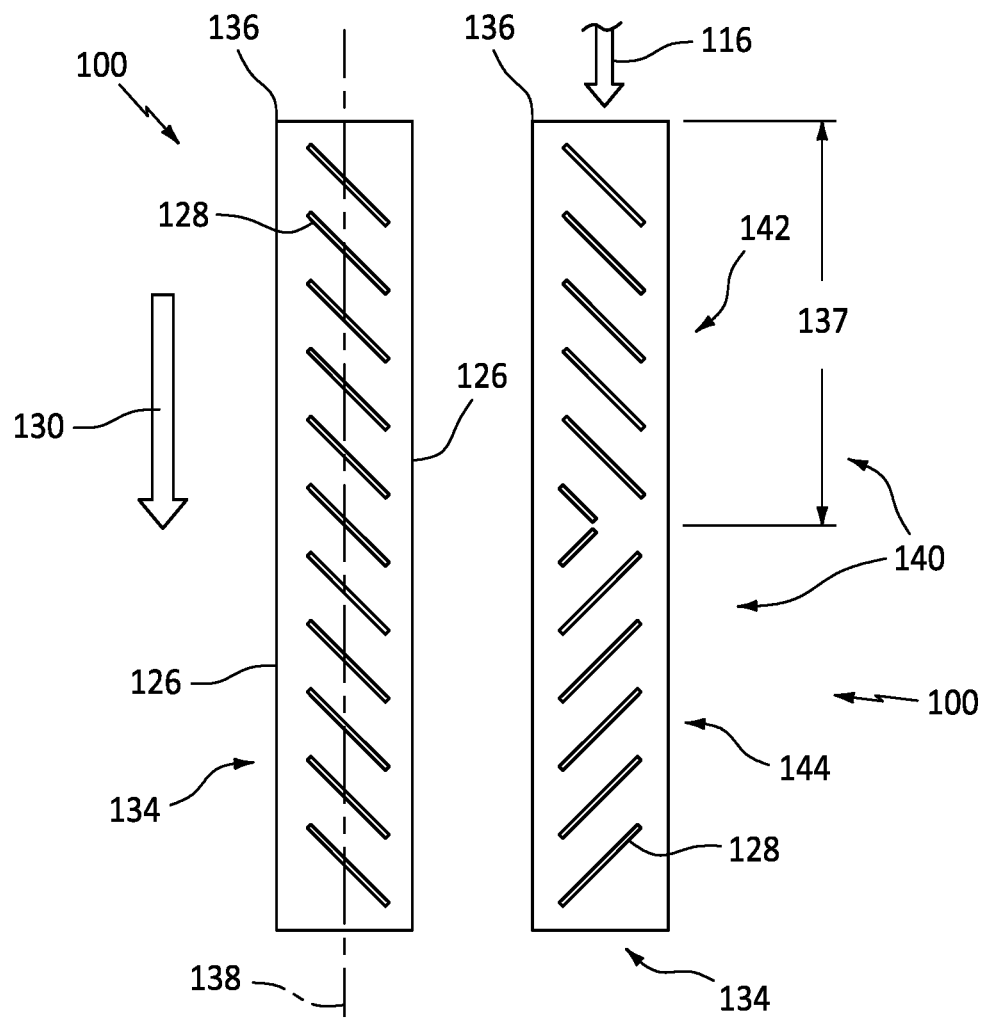
FIG. 5 are plan view schematic representations of exemplary layout for asymmetric trip strips in a flow passage with turbulators.

Referring also to FIG. 5. Showing exemplary embodiments of flow passage 100 with trip strips 128, one such type of trip strip 128 configuration can be the skewed trip 134, which is inherently asymmetric. The skewed trip 134 has an angle theta e, which can be any degree of angle from the perpendicular of the center of passage 138, as shown. Due to the asymmetric nature of the skewed trip 134, heat exchange is non-uniform and profile perpendicular to the streamwise flow direction is asymmetric. For shorter passages with small Length-to-diameter ratios (L/d<20) L=length of passage 100 along flow direction 130. d=diameter of passage 100, this asymmetry has not been shown to significantly impact streamwise heat transfer decay rate.

However, for larger L/d passages (L/d>20), the asymmetric profile of the temperature in the passage 100 can lead to degraded heat transfer performance at regions sufficiently downstream (L/d>20) of a passage inlet 136. As seen in FIG. 5, by periodically changing trip strip 134 orientation, (reflecting around a streamwise center of passage 138) at a frequency of L/d≤20 137, called a periodic reflection 140, a temperature profile can be re-started and prevent decay in heat transfer otherwise expected without the periodic reflection 140. The periodic reflection 140 involves switching the orientation of the trip strip 134 relative to the center of passage 138, such as reversing the orientation from an angle theta that has a slant from upper left to lower right direction 142 to a slant from lower left to upper right direction 144. In an exemplary embodiment, the periodic reflection 140 can include the periodic alternation of trip strip 134 direction at increments less than or equal to 20 L/d. The periodic alteration of trip strip 134 direction can facilitate directing the fluid 116 towards the opposite wall, effectively serving to mix the flow back to a more uniform temperature, more capable of exchanging heat at larger flow passage 100 lengths. The exemplary embodiments disclose above for the flow passage 100 can be applicable for a fluid cooling passage, but same principles apply to fluid heating passage, but temperature asymmetry in the cooling passage is opposite of the heating passage. In an exemplary embodiment, the disclosed design is applicable cast heat exchangers for high pressure and temperature turbomachinery applications where conventional sheet metal heat exchangers are not viable. In an exemplary embodiment, the disclosed design is relevant for cast turbulated (tripped) passages with asymmetric turbulators (with respect to transverse flow direction parallel to the plane of tripped wall). In an exemplary embodiment, the disclosed design is relevant for passages with length-to-diameter (L/d) of greater than or equal to 20. In an exemplary embodiment, the disclosed design is applicable to any cast turbomachinery component with turbulated passages designed to transfer heat between a working fluid and solid component. This includes, but not limited to, airfoils (vanes/blades), BOAS, heat exchangers.

A technical advantage of the disclosed layout for asymmetric trip strips includes a minimal change to trip strip layout within a long cast turbulated passage to prevent decay in heat transfer associated with asymmetric trip strips.

Another technical advantage of the disclosed layout for asymmetric trip strips includes a minimal impact to pressure drop characteristics compared to a similar design without periodic orientation changes.

Another technical advantage of the disclosed layout for asymmetric trip strips includes a design that enables the use of asymmetric trip strips in long passages where low pressure drop is required.

There has been provided a layout for asymmetric trip strips. While the layout for asymmetric trip strips has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A layout for asymmetric trip strips comprising:
   a flow passage having a lower wall and an upper wall opposite the lower wall, each of the lower wall and the upper wall including an inner surface, the flow passage having a passage inlet and a length L and a diameter d;
   multiple skewed trip strips extending from at least one inner surface of the lower wall or the upper wall; and
   at least one periodic reflection of the skewed trip strips along the flow passage downstream of the passage inlet occurs at a frequency of L/d≤20.

2. The layout for asymmetric trip strips according to claim 1, wherein the multiple skewed trip strips are formed in each of the lower wall and the upper wall; and the at least one periodic reflection of the skewed trip strips is formed in each of the lower wall and the upper wall.

3. The layout for asymmetric trip strips according to claim 1, wherein the periodic reflection can include the periodic alternation of the direction of the skewed trip strips in the flow passage having a ratio L/d of greater than or equal to 20.

4. The layout for asymmetric trip strips according to claim 1, wherein the periodic reflection includes switching an orientation of the skewed trip strips relative to a center of passage.

5. The layout for asymmetric trip strips according to claim 4, wherein the periodic reflection includes reversing an orientation of an angle of the skewed trip strips.

6. The layout for asymmetric trip strips according to claim 1, wherein the skewed trip strips are configured with an asymmetric orientation with respect to a flow direction parallel to a plane of a wall supporting the skewed trip strips.

7. The layout for asymmetric trip strips according to claim 1, wherein the flow passage is formed in a gas turbine component selected from the group consisting of a blade, a vane, a blade outer air seal, and heat exchanger.

8. A layout for asymmetric trip strips for a component for a gas turbine engine comprising:
   an external surface bounding a gas path of the gas turbine engine;

a flow passage having an inlet configured to deliver an airflow therethrough, including:
  an internal surface located opposite the external surface, the internal surface and the external surface together defining a component wall;
  a plurality of skewed trip strips located along the internal surface, each skewed trip strip extending from the internal surface; and
    at least one periodic reflection of the skewed trip strips along the flow passage downstream of the passage inlet occurs at a frequency of $L/d \leq 20$.

9. The layout for asymmetric trip strips according to claim 8, wherein the skewed trip strips are oriented with an angle, wherein the periodic reflection includes reversing an orientation of the angle of the skewed trip strips.

10. The layout for asymmetric trip strips according to claim 8, wherein the periodic reflection can include a periodic alternation of the direction of the skewed trip strips in the flow passage having a ratio L/d of greater than or equal to 20.

11. The layout for asymmetric trip strips according to claim 8, wherein the periodic reflection includes switching an orientation of the skewed trip strip relative to a center of passage.

12. The layout for asymmetric trip strips according to claim 8, wherein the skewed trip strips are configured with an asymmetric orientation with respect to a flow direction parallel to a plane of a wall supporting the skewed trip strips.

13. The layout for asymmetric trip strips according to claim 8, wherein the flow passage is formed in the gas turbine component selected from the group consisting of a blade, a vane, a blade outer air seal, and a heat exchanger.

14. A process for managing a fluid flow through a flow passage having asymmetric trip strips for a gas turbine engine component comprising:
  bounding a gas path of the gas turbine engine with an external surface;
  delivering an airflow through a flow passage having an inlet;
  defining a component wall with an internal surface located opposite the external surface;
  locating a plurality of the asymmetric trip strips along the internal surface, each asymmetric trip strip extending from the internal surface; and
  locating at least one periodic reflection of the asymmetric trip strips along the flow passage downstream of the passage inlet occurring at a frequency of $L/d \leq 20$.

15. The process of claim 14, wherein the asymmetric trip strips are oriented with an angle; and
  reversing the orientation of the angle of the asymmetric trip strips.

16. The process of claim 14, further comprising:
  periodic alternation of the direction of the asymmetric trip strips in the flow passage having a ratio L/d of greater than or equal to 20.

17. The process of claim 14, further comprising:
  switching an orientation of the asymmetric trip strip relative to a center of passage.

18. The process of claim 14, further comprising:
  configuring the asymmetric trip strips with an asymmetric orientation with respect to a flow direction parallel to a plane of a wall supporting the asymmetric trip strips.

19. The process of claim 14, wherein delivering the airflow through the flow passage includes at least one of a fluid cooling passage and a fluid heating passage.

20. The process of claim 14, further comprising:
  reforming a vortex downstream of the periodic reflection within the flow passage by periodic alteration of asymmetric trip strips direction configured to redirect fluid to mix the flow of the fluid.

* * * * *